United States Patent
Moah et al.

(10) Patent No.: US 11,694,166 B2
(45) Date of Patent: Jul. 4, 2023

(54) SYSTEMS AND METHODS FOR DYNAMICALLY DISPLAYING RECIPIENT CALENDAR INFORMATION IN ELECTRONIC MESSAGES

(71) Applicant: Baydin, Inc., Mountain View, CA (US)

(72) Inventors: Aye M. Moah, Mountain View, CA (US); Michael J. Chin, Mountain View, CA (US); Steven J. Molitor, Mountain View, CA (US); Cody T. Huang, Mountain View, CA (US); Mai-Chi T. Vu, Mountain View, CA (US); Daron A. Hall, Mountain View, CA (US); Alexander W. Moore, Mountain View, CA (US)

(73) Assignee: Baydin, Inc., Santa Clara, CA (US)

( * ) Notice: Subject to any disclaimer, the term of this patent is extended or adjusted under 35 U.S.C. 154(b) by 0 days.

(21) Appl. No.: 17/492,496

(22) Filed: Oct. 1, 2021

(65) Prior Publication Data
US 2023/0108308 A1    Apr. 6, 2023

(51) Int. Cl.
*G06Q 10/1093*   (2023.01)
*H04L 51/18*    (2022.01)

(52) U.S. Cl.
CPC ......... *G06Q 10/1093* (2013.01); *H04L 51/18* (2013.01)

(58) Field of Classification Search
CPC ............................ G06Q 10/1093; H04L 51/18
See application file for complete search history.

(56) References Cited

U.S. PATENT DOCUMENTS

| | | |
|---|---|---|
| 6,457,045 B1 | 9/2002 | Hanson et al. |
| 6,581,050 B1 | 6/2003 | Horvitz et al. |
| 6,604,079 B1 | 8/2003 | Ruvolo et al. |
| 8,065,175 B1 | 11/2011 | Lewis |
| 8,887,064 B1 * | 11/2014 | Oh ..................... G06Q 10/109 715/963 |

(Continued)

OTHER PUBLICATIONS

"Outlook Group Calendar Solutions" Outlookipedia, 2008, <http://www.outlookipedia.com/Outlook/group-calendar.aspx> (Year: 2008), (7 pages).

(Continued)

*Primary Examiner* — Johnny B Aguiar
(74) *Attorney, Agent, or Firm* — Foley & Lardner LLP

(57) ABSTRACT

Systems and methods for presenting calendar information in electronic messages can include a data processing system receiving a request for calendar information for display in an electronic message responsive to the client device accessing the electronic message. The data processing system can identify, using information in the request, the calendar information of the sender of the electronic message and calendar information of the recipient of the electronic message. The data processing system can retrieve the calendar information of the sender of the electronic message and the calendar information of the recipient of the electronic message. The data processing system can automatically generate an image depicting the calendar information of the sender of the electronic message and the calendar information of the recipient of the electronic message, and send instructions to the client device to cause display of the image within the electronic message accessed by the client device.

20 Claims, 8 Drawing Sheets

(56) References Cited

U.S. PATENT DOCUMENTS

| | | | |
|---|---|---|---|
| 2003/0004773 A1 | 1/2003 | Clark et al. | |
| 2003/0130882 A1 | 7/2003 | Shuttleworth et al. | |
| 2004/0215479 A1 | 10/2004 | Dorsey et al. | |
| 2005/0091674 A1 | 4/2005 | Knight et al. | |
| 2005/0102245 A1 | 5/2005 | Edlund et al. | |
| 2005/0198124 A1 | 9/2005 | McCarthy | |
| 2006/0010206 A1 | 1/2006 | Apacible et al. | |
| 2006/0168346 A1 | 7/2006 | Chen et al. | |
| 2006/0200374 A1 | 9/2006 | Nelken | |
| 2007/0022167 A1 | 1/2007 | Citron | |
| 2007/0244977 A1 | 10/2007 | Atkins | |
| 2007/0260523 A1 | 11/2007 | Schadt et al. | |
| 2008/0015922 A1 | 1/2008 | Nelken | |
| 2008/0034047 A1* | 2/2008 | Rosenberg | G06Q 10/109 709/206 |
| 2009/0089377 A1 | 4/2009 | Rubinger | |
| 2009/0089389 A1 | 4/2009 | Chen et al. | |
| 2009/0100010 A1 | 4/2009 | Dargahi et al. | |
| 2009/0100347 A1 | 4/2009 | Schemers et al. | |
| 2009/0157466 A1* | 6/2009 | Bank | G06Q 10/1095 705/7.19 |
| 2009/0235280 A1 | 9/2009 | Tannier et al. | |
| 2009/0248806 A1 | 10/2009 | Teman | |
| 2010/0159883 A1 | 6/2010 | Pascal et al. | |
| 2010/0179961 A1 | 7/2010 | Berry et al. | |
| 2010/0191566 A1* | 7/2010 | Loring | G06Q 10/1093 705/7.19 |
| 2011/0106892 A1 | 5/2011 | Nelson et al. | |
| 2011/0125545 A1 | 5/2011 | Lehmann et al. | |
| 2012/0011196 A1 | 1/2012 | Green et al. | |
| 2012/0042025 A1 | 2/2012 | Jamison et al. | |
| 2013/0159426 A1 | 6/2013 | Milic-Frayling et al. | |
| 2013/0174002 A1 | 7/2013 | Jones et al. | |
| 2014/0229560 A1* | 8/2014 | Gray | H04L 51/046 709/206 |
| 2014/0244734 A1 | 8/2014 | Nutt et al. | |
| 2016/0366079 A1* | 12/2016 | Razavian | H04L 51/18 |
| 2018/0253698 A1* | 9/2018 | Moore | G06Q 10/1095 |
| 2021/0081098 A1* | 3/2021 | Zhong | G06Q 10/107 |

OTHER PUBLICATIONS

"Save Time with an Outlook Calendar Tip—Drag and Drop" Cotria, Jun. 9, 2012, <http://www.cotria.com/free_advice/powerful_outlook_tip_calendar>, (Year: 2012) 1 page.

Final Office Action on U.S. Appl. No. 15/969,699 dated Feb. 16, 2021.

Non-Final Office Action on U.S. Appl. No. 15/969,699 dated Mar. 30, 2020.

Office Action on U.S. Appl. No. 14/198,791 dated Sep. 15, 2016 (25 pages).

U.S. Final Office Action on U.S. Appl. No. 14/299,710 dated Dec. 27, 2017 (19 pages).

U.S. Notice of Allowance on U.S. Appl. No. 14/299,710 dated Apr. 6, 2018 (25 pages).

U.S. Notice of Allowance on U.S. Appl. No. 15/969,699 dated Jan. 5, 2022.

U.S. Office Action on U.S. Appl. No. 14/299,710 dated Sep. 11, 2015 (20 pages).

U.S. Office Action on U.S. Appl. No. 14/198,791 dated Dec. 28, 2017 (20 pages).

U.S. Office Action on U.S. Appl. No. 14/198,791 dated May 23, 2017 (22 pages).

U.S. Office Action on U.S. Appl. No. 14/198,791 dated Aug. 23, 2018.

U.S. Office Action on U.S. Appl. No. 14/299,710 dated Jan. 5, 2017 (25 pages).

U.S. Office Action on U.S. Appl. No. 14/299,710 dated Jul. 29, 2016 (17 pages).

U.S. Office Action on U.S. Appl. No. 14/299,710 dated Mar. 22, 2017 (18 pages).

U.S. Office Action on U.S. Appl. No. 14/299,710 dated Mar. 18, 2016 (23 pages).

Woeltji, H., Seiwart, L., "How to Schedule Meetings So They are Convenient, Effective, and Fun". Microsoft Press Store, Sep. 26, 2011, <https://www.microsoftpressstore.com/articles/article.aspx?p=2225069&seqNum=4> (Year: 2011), (14 pages).

* cited by examiner

SYSTEMS AND METHODS FOR DYNAMICALLY DISPLAYING RECIPIENT CALENDAR INFORMATION IN ELECTRONIC MESSAGES

BACKGROUND

Electronic messaging systems such as electronic mail (email) technology allows for exchange of digital messages between computer users across computer networks. Electronic messages do not provide for the ability for electronic messages to be modified after they are sent, which prevents electronic communication systems from offering dynamic messages that can change based on a user's interactions or other data sources.

SUMMARY

The systems and methods described herein improve upon conventional electronic messaging systems by providing up-to-date calendar information and allowing for scheduling calendar events within an electronic message, thereby extending the capabilities of conventional electronic messaging systems. In particular, the systems and methods described herein enable users to efficiently create scheduling arrangements through the body of transmitted emails or other electronic messages, without switching to external calendar applications or interfaces. As used herein, electronic messages are not necessarily limited to emails but may include instant messages, online chat messages, social networks' messaging or the like. By communicating with a data processing system or computer server thereof, a client application or module operating, for example, as a browser plugin, a browser extension, an add-on module, an email application or other electronic messaging application on a client device, can provide real-time scheduling information in an electronic message body by inserting a dynamically generated image seamlessly into the body of an email. The image can include user-selectable elements, or image maps, that allow a user to interact with and create scheduling arrangements via the electronic message body. In addition, the systems, devices and methods described herein allow for presenting calendar information of both the sender and the recipient of the electronic message in the body of the electronic message, providing additional insight and convenience for the user to make appropriate scheduling arrangements.

At least one aspect of the present disclosure relates to a data processing system that overlays scheduling information in electronic messages. The data processing system can include, for example, at least one processor and at least one memory that stores computer-executable instructions. The data processing system can execute the computer-executable instructions to perform the various operations described herein. The data processing system can receive, from a client device, a request for calendar information for display in an electronic message responsive to the client device accessing the electronic message. The request can include information about a recipient of the electronic message and an identifier indicative of calendar information of a sender of the electronic message. The identifier and the information about the recipient can be extracted by the client device from the electronic message. The data processing system can identify, using the identifier, the calendar information of the sender of the electronic message. The data processing system can identify, using the identifier and the information about the recipient of the electronic message, calendar information of the recipient of the electronic message. The data processing system can retrieve the calendar information of the sender of the electronic message and the calendar information of the recipient of the electronic message. The data processing system can automatically generate an image depicting the calendar information of the sender of the electronic message and the calendar information of the recipient of the electronic message. The data processing system can send instructions to cause display of the image within the electronic message accessed by the client device.

In some implementations, the image is a second image and the identifier is an identifier of a first image depicting calendar information of the sender of the electronic message. In some implementations, in identifying the calendar information of the sender of the electronic message, the data processing system can identify at least one of one or more calendars of the sender of the electronic message, a time duration, or a plurality of designated time slots within the time period. In some implementations, the plurality of designated time slots include at least one of time slots indicating availability of the sender of the electronic message, time slots proposed by the sender of the electronic message or time slots during which the sender of the electronic message is busy.

In some implementations, the data processing system can identify the calendar information of the recipient of the electronic message using one or more calendars of the recipient and the at least one of the one or more calendars of the sender of the electronic message, the time duration or the plurality of designated time slots within the time period. In some implementations, the data processing system can provide a user interface to a client device of the sender of the electronic message for entering the at least one of the one or more calendars of the sender of the electronic message, the time duration, or the plurality of designated time slots within the time period. In some implementations, the data processing system can receive, from the client device of the sender of the electronic message, the at least one of the one or more calendars of the sender of the electronic message, the time duration or the plurality of designated time slots within the time period.

In some implementations, the request further includes a flag indicating that the image is to include both the calendar information of the sender of the electronic message and the calendar information of the recipient of the electronic message. In some implementations, the data processing system can provide an image map to the client device for display over the image at the electronic message. The image map can include a plurality of map slices. Each map slice of the plurality of map slices can be associated with a corresponding time slot of a plurality of time slots depicted by the image, and can include a corresponding uniform resource locator (URL).

In some implementations, the data processing system can receive, from the client device responsive to selecting a time slot of the plurality of time slots, a URL of a map slice associated with the time slot selected by the client device. The data processing system can determine, based on the URL, the time slot selected by the client device. The data processing system can send a response message to the client device responsive to determining the time slot selected by the client device.

In some implementations, the response message includes a response message instructing the client device to generate a calendar invite message for sending to the sender of the electronic message, if the time slot selected by the client device is a time slot where both the sender and recipient of the electronic message are available, or a response message instructing the client device to generate an error message otherwise.

At least one other aspect of the present disclosure is generally directed to a method for overlaying calendar information in electronic messages. The method can include receiving, by a data processing system from a client device, a request for calendar information for display in an electronic message responsive to the client device accessing the electronic message. The request can include information about a recipient of the electronic message and an identifier indicative of calendar information of a sender of the electronic message. The identifier and the information about the recipient can be extracted by the client device from the electronic message. The method can include identifying, by the data processing system using the identifier, the calendar information of the sender of the electronic message. The method can include identifying, by the computer server, using the identifier and the information about the recipient of the electronic message, calendar information of the recipient of the electronic message. The method can include retrieving, by the computer server, the calendar information of the sender of the electronic message and the calendar information of the recipient of the electronic message. The method can include automatically generating, by the computer server, an image depicting the calendar information of the sender of the electronic message and the calendar information of the recipient of the electronic message. The method can include sending, by the data processing system, instructions to cause display of the image within the electronic message accessed by the client device.

In some implementations, the image is a second image and the identifier is an identifier of a first image depicting calendar information of the sender of the electronic message. In some implementations, identifying the calendar information of the sender of the electronic message includes identifying at least one of one or more calendars of the sender of the electronic message, a time duration, or a plurality of designated time slots within the time period. In some implementations, the plurality of designated time slots include at least one of time slots indicating availability of the sender of the electronic message, time slots proposed by the sender of the electronic message or time slots during which the sender of the electronic message is busy.

In some implementations, the method can include identifying the calendar information of the recipient of the electronic message using one or more calendars of the recipient and the at least one of the one or more calendars of the sender of the electronic message, the time duration or the plurality of designated time slots within the time period. In some implementations, the method can include providing, by the computer server, a user interface to a client device of the sender of the electronic message for entering the at least one of the one or more calendars of the sender of the electronic message, the time duration or the plurality of designated time slots within the time period. In some implementations, the method can include receiving, by the data processing system from the client device of the sender of the electronic message, the at least one of the one or more calendars of the sender of the electronic message, the time duration or the plurality of designated time slots within the time period.

In some implementations, the request further includes a flag indicating that the image is to include both the calendar information of the sender of the electronic message and the calendar information of the recipient of the electronic message. In some implementations, the method can include providing, by the computer server, an image map to the client device for display over the image at the electronic message. The image map can include a plurality of map slices. Each map slice of the plurality of map slices can be associated with a corresponding time slot of a plurality of time slots depicted by the image, and can include a corresponding uniform resource locator (URL).

In some implementations, the method can include receiving, by the data processing system from the client device responsive to the client device selecting a time slot of the plurality of time slots, a URL of a map slice associated with the time slot selected by the client device. The data processing system can determine, based on the URL, the time slot selected by the client device. The data processing system can send a response message to the client device responsive to determining the time slot selected by the client device. In some implementations, the response message can include a response message instructing the client device to generate a calendar invite message for sending to the sender of the electronic message, if the time slot selected by the client device is a time slot where both the sender and recipient of the electronic message are available, or a response message instructing the client device to generate an error message otherwise.

At least one other aspect of the present disclosure is non-transitory computer-readable medium storing computer-executable instructions. The computer-executable instructions, when executed by at least one processor, cause the at least one processor to carry out operations to overlay scheduling information in electronic messages. The computer-executable instructions, when executed, can cause the at least one processor to receive, from a client device, a request for calendar information for display in an electronic message responsive to the client device accessing the electronic message. The request can include information about a recipient of the electronic message and an identifier indicative of calendar information of a sender of the electronic message. The identifier and the information about the recipient can be extracted by the client device from the electronic message. The computer-executable instructions, when executed, can cause the at least one processor to identify, using the identifier, the calendar information of the sender of the electronic message. The computer-executable instructions, when executed, can cause the at least one processor to identify, using the identifier and the information about the recipient of the electronic message, calendar information of the recipient of the electronic message. The computer-executable instructions, when executed, can cause the at least one processor to retrieve the calendar information of the sender of the electronic message and the calendar information of the recipient of the electronic message. The computer-executable instructions, when executed, can cause the at least one processor to automatically generate an image depicting the calendar information of the sender of the electronic message and the calendar information of the recipient of the electronic message. The computer-executable instructions, when executed, can cause the at least one processor to send instructions to cause the image to be displayed within the electronic message accessed by the client device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using one or more suitable apparatuses, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
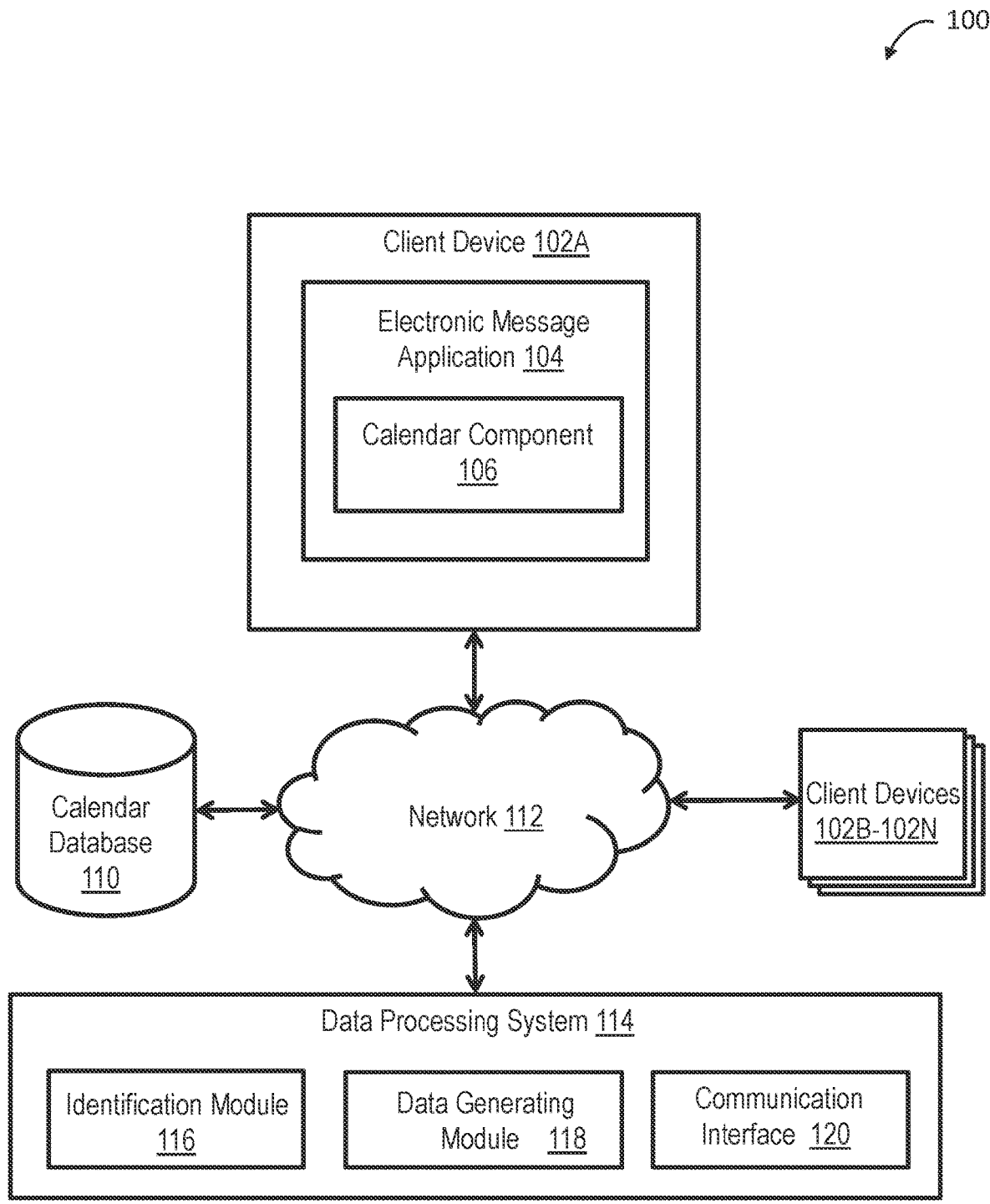
FIG. 1 illustrates a block diagram of an example system for presenting calendar information in electronic messages, in accordance with one or more implementations.

Below are detailed descriptions of various concepts related to, and implementations of, techniques, approaches, methods, apparatuses, and systems for overlaying calendar information in electronic messages. The various concepts introduced above and discussed in greater detail below may be implemented in any of numerous ways, as the described concepts are not limited to any particular manner of implementation. Examples of specific implementations and applications are provided primarily for illustrative purposes.

As outlined briefly above, conventional electronic messaging systems, such as email systems instant messaging systems, online chat systems or social networks' messaging systems, among others, do not include functionality that allows for the presentation of dynamic content within the body of electronic messages, e.g., at the time the electronic messages are accessed by recipients. The systems and methods of this technical solution solve these and other technical problems by providing a calendar component (sometimes referred to herein as calendar application) that enables a recipient of an electronic message to dynamically view up-to-date calendar information of the sender and/or calendar information of the recipient in an electronic message body for the purposes of accurate scheduling. The calendar component can be provided to execute on client devices of senders and/or recipients of electronic messages. The calendar component can enable a user of the calendar component to overlay their own calendar information over calendar information provided by the sender, thereby allowing the user to view any potential scheduling conflicts without accessing or switching to other, external applications (e.g., calendar applications or tools). The systems and methods described herein provide an improvement over conventional electronic messaging systems by embedding and updating dynamic content in the body of the electronic message, allowing the user to access functionality that would otherwise require external scheduling applications.

To present dynamic calendar content in the body of an electronic message, the calendar component executing on a client device of the sender of electronic message and/or the data processing system described herein can embed tags and/or executable instructions in the body of the electronic message that reference the data processing system associated with the calendar component. The tags and or executable instructions can be, for example, hypertext markup language (HTML) tags that include a uniform resource locator (URL) that points to a network location associated with a computer server or the data processing system. When the electronic message is displayed or accessed in an electronic message application executing on a client device of a recipient of the electronic message, the calendar component executing thereon can retrieve the tags in the body of the email and transmit (or cause the electronic message application to transmit) a request for calendar content using the URL embedded in the tags. This request can include various information that facilitates the authorization of access and display of up-to-date calendar information or calendar content in the body of the accessed electronic message.

Upon receiving the request, the data processing system can access calendar information or calendar content of the sender of the email, which may be specified or authorized by the sender at the time the email was sent or composed (e.g., when using the calendar component to embed or allow embedding the calendar information/content in the electronic message at the client device associated with the sender of the electronic message). Accessing the calendar information/content may include authenticating the sender and/or the recipient, as described in greater detail herein. The data processing system can then generate an image that includes the calendar information specified by the sender, and transmit the image to the electronic messaging application that initiated the request using the URL. The tags in the body of the electronic message can include instructions that cause the electronic messaging application to display the image seamlessly within the body of the electronic message. Additional tags or instructions can specify portions of the image that are selectable by a user, and can cause the electronic messaging application to perform one or more operations as described in greater detail herein.

The image can include a toggle element (e.g., a sliding bar) that allows a recipient of the electronic message to enable or disable overlay of the calendar information/content of the sender with their own (e.g., recipient's) calendar information/content. For example, the tags in the electronic message body can include a selectable or interactive element (e.g., toggle, slide bar, icon, button, link, or other actionable graphical element or object that causes the electronic messaging application to enable or disable display or rendering of calendar information or content of the recipient with calendar information or content of the sender. Upon receiving the request, the data processing system can generate a first image that includes or depicts the calendar information of the sender and/or a second image that includes or depicts the calendar information of the recipient overlaying or partially overlapping the calendar information of the sender. The data processing system can transmit the first and/or the second image to the electronic messaging application. The electronic messaging application and/or the calendar component can seamlessly display the second image in the body of the electronic image (e.g., instead of the first image) when display of the recipient's calendar information/content is enabled, allowing the recipient to view up-to-date calendar information of the sender and the recipient without accessing an external scheduling application.

An image map accessible by the embedded in the body of the email by the calendar component executing at the client device of the sender can allow the recipient of the electronic message to select one or more available time slots depicted in the image. Upon receiving a selection of a time slot, the calendar component and/or the electronic messaging application executing at the client device of the recipient can transmit a scheduling request to the data processing system or a computer server thereof. The data processing system can then transmit a calendar invitation message to both the sender and the recipient according to the selection of the available time slot. In doing so, the systems and methods described herein extend the functionality of electronic messaging systems to seamlessly depict calendar information and perform scheduling operations. Although email is described herein as an example, it will be appreciated that the systems and methods described herein can extend the functionality of a variety of messaging systems and applications, such as instant messaging systems, online chat systems, or social networks' messaging systems, among others. These and other improvements are described in greater detail herein.

Referring now to FIG. 1, illustrated is a block diagram of an example system 100 for presenting or integrating calendar information and/or calendar functionalities in electronic messages, in accordance with one or more implementations. The system 100 can include one or more client devices 102A-102N (sometimes generally referred to as the client device(s) 102), at least one calendar database 110, a data processing system 114 including at least one data processing system 114, and at least one network 112. The client devices 102 can include an electronic message application 104, which itself can include a calendar component 106. The data processing system data processing system 114 can include an identification module 116, a data generating module 118, and a communication interface 120. In some implementations, the calendar database 110 can be one of many calendar databases 110 (not pictured), which are similarly accessible by the components of the system 100 via the network 112.

Each of the components (e.g., the client devices 102, the data processing system data processing system 114, the electronic message application 104, the calendar component 106, the calendar database 110, the identification module 116, the data generating module 118, the communication interface 120, etc.) of the system 100 can be implemented using hardware components, software components or a combination of software and hardware components. Each of the components of the data processing system data processing system 114 or the client device(s) 102 can perform the functionalities detailed herein.

The data processing system data processing system 114 can include at least one processor and a memory (e.g., a processing circuit). The memory can store computer-executable instructions that, when executed by the processor, cause the processor to perform one or more of the operations described herein. The processor may include a microprocessor, an application-specific integrated circuit (ASIC), a field-programmable gate array (FPGA), a graphics processing unit (GPU), or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 114 can include one or more computing devices or servers that can perform various functions as described herein. The data processing system 114 can include any or all of the components and perform any or all of the functions of the computer system 400 described herein in conjunction with FIG. 4.

The network 112 can include computer networks such as the Internet, local, wide, metro or other area networks, intranets, satellite networks, other computer networks such as voice or data mobile phone communication networks, and combinations thereof. The data processing system 114 of the system 1 can communicate via the network 112, for instance with at least one calendar database 110. The network 112 may be any form of computer network that can relay information between the client devices 102, the data processing system 114, the calendar databases 110, and one or more content sources, such as web servers, amongst others. In some implementations, the network 112 may include the Internet and/or other types of data networks, such as a local area network (LAN), a wide area network (WAN), a cellular network, a satellite network, or other types of data networks. The network 112 may also include any number of computing devices (e.g., computers, servers, routers, network switches, etc.) that are configured to receive and/or transmit data within the network 112. The network 112 may further include any number of hardwired and/or wireless connections. Any or all of the computing devices described herein (e.g., the data processing system 114, the client devices 102, the computer system 400, etc.) may communicate wirelessly (e.g., via WiFi, cellular, radio, etc.) with a transceiver that is hardwired (e.g., via a fiber optic cable, a CAT5 cable, etc.) to other computing devices in the network 112. Any or all of the computing devices described herein (e.g., the data processing system 114, the computer system 400, etc.) may also communicate wirelessly with the computing devices of the network 112 via a proxy device (e.g., a router, network switch, or gateway).

The calendar database 110 can be a database that stores or maintains any of the calendar information described herein. The calendar database 110 can maintain one or more data structures, which may contain, index, or otherwise store calendar information for various users of the system 100. In some implementations, the calendar database 110 can be internal to the data processing system 114. In some implementations, the calendar database 110 can be external to the data processing system 114, and may be accessed via the network 112. The calendar database 110 can be distributed across many different computer systems or storage elements, and may be accessed via the network 112 or a suitable computer bus interface. In some implementations, the system 100 can include multiple calendar databases 110, for example, with each calendar database 110 corresponding to a calendar service provider. The calendar information maintained in the calendar database 110 can include, for example, appointments, scheduled meetings or other scheduled events associated with a particular user. The appointments and scheduled meetings can be stored in association with corresponding dates, times, and duration values, which each indicate when and how long each appointment or scheduled meeting would occur. In addition, each appointment may be stored in association with a name, a location, or a list of attendees. The information in the calendar database 110 can be accessed, for example, by a user or system that is authorized to access the calendar database 110. For example, the calendar database 110 can be a computing system that requests authorization from a user or system prior to providing any calendar information associated with a particular user. The user (or another computing device of the system 100) may login to the calendar database 110 to access requested information associated with the login information, or may provide a token that indicates the user or the system is authorized to access particular information.

In some implementations, the client device 102 or the data processing system 114 can communicate with the calendar database 110 to request a token for specified information in the calendar database. In some implementations, authentication of a user (e.g., a recipient and/or a sender of an electronic message) to access calendar information in calendar database 110 may be performed using the Open Authorization Standard (e.g., OAuth 2.0, etc.). Communications between the computing devices (e.g., the data processing system 114, the client devices 102, etc.) and the calendar database 110 may be performed via one or more application programming interfaces (APIs), that allow computing devices (or applications executing thereon) to request specific calendar information (e.g., specific to a particular user, etc.) based on authorization information provided in the request. For example, the authorization information can be login information, a token representing the authorized information, a digital certificate, or OAuth 2.0 information. If the requesting computing device is authorized to access the requested information, the calendar database 110 can transmit or provide the requested information to the requesting computing device, for example, via the network 112 according to API of the calendar database 110. If the requesting computing device is not authorized, the calendar database 110 may return an error message to the requesting computing device, and not provide the requested calendar information.

Each client device 102 can include a local machine, computer, laptop, desktop, smart phone, tablet, personal digital assistant, set-top box for a television set, a smart television, or server device configured to communicate with other devices via the network 112. The client device 102 can include a processor and a memory. The memory may store machine instructions that, when executed by the processor, cause the processor to perform one or more of the operations described herein. The memory may also store data to effect presentation of one or more resources, content items, etc. on the computing device. The processor may include a microprocessor, an ASIC, an FPGA, a GPU, or combinations thereof. The memory may include, but is not limited to, electronic, optical, magnetic, or any other storage or transmission device capable of providing processor with program instructions. The memory may include a floppy disk, CD-ROM, DVD, magnetic disk, memory chip, ROM, RAM, EEPROM, EPROM, flash memory, optical media, or any other suitable memory from which processor can read instructions. The processor may execute computer-executable instructions to carry out the operations described herein. The instructions may include code from any suitable computer programming language such as, but not limited to, ActionScript®, C, C++, C#, HTML, Java®, JavaScript®, Perl®, Python®, Visual Basic®, and XML.

The client device 102 can include (e.g., execute) an electronic message application 104 for accessing, sending, receiving and/or composing electronic messages. The electronic message application 104 can be, for example, a web-based email or electronic messaging service provided via a web browser or other application such as an email application that executes natively on the client device 102. In some implementations, the data processing system 114 or a web server may provide the electronic message application 104 to the client device 102. The electronic message application 104 can be any type of messaging software associated with, for example, email services, instant messaging services, online chat services, or social networks' messaging services, among others. The client device 102 may download the electronic message application 104 and/or the calendar component 106 from the data processing system 114 and/or from an application distribution server (not pictured). The calendar component 106 can be a component of the electronic message application 104 or a separate component that is configured to interact with the electronic message application 104. The calendar component 106 and the electronic message application 104 can be provided by the same provider or by different providers.

The electronic message application 104 can be an email application, such as a web email application or enterprise email application, a chat application, a short message service (SMS) application, an instant messaging application, an online chat application, a social networks' messaging application, an online meetings application, or another type of application that provides electronic messaging capabilities. The electronic message application 104 can incorporate, integrate and/or communicate with the calendar component 106. The calendar component 106 may be implemented as a separate software application or may be integrated in applications providing electronic messaging solutions (e.g., the electronic messaging application 104). The calendar component 106 may be implemented using scripted language (e.g., JavaScript or Python), non-scripted language (e.g., C, C++, C#, or Java), or other forms of computer executable instructions. In some implementations, the calendar component 106 may be a plugin or an extension for a web browser or an add-on module which may be provided by or otherwise associated with the data processing system 114. The add-on module can be integrated into the electronic message application. For example, the calendar component 106 may be installed or accessed via the data processing system 114, a computer server thereof, an application distribution server (not pictured) or another computing system associated with the data processing system 114. In some implementations, the calendar component 106 may be implemented as an original component of the electronic message application 104.

Figure 2A:
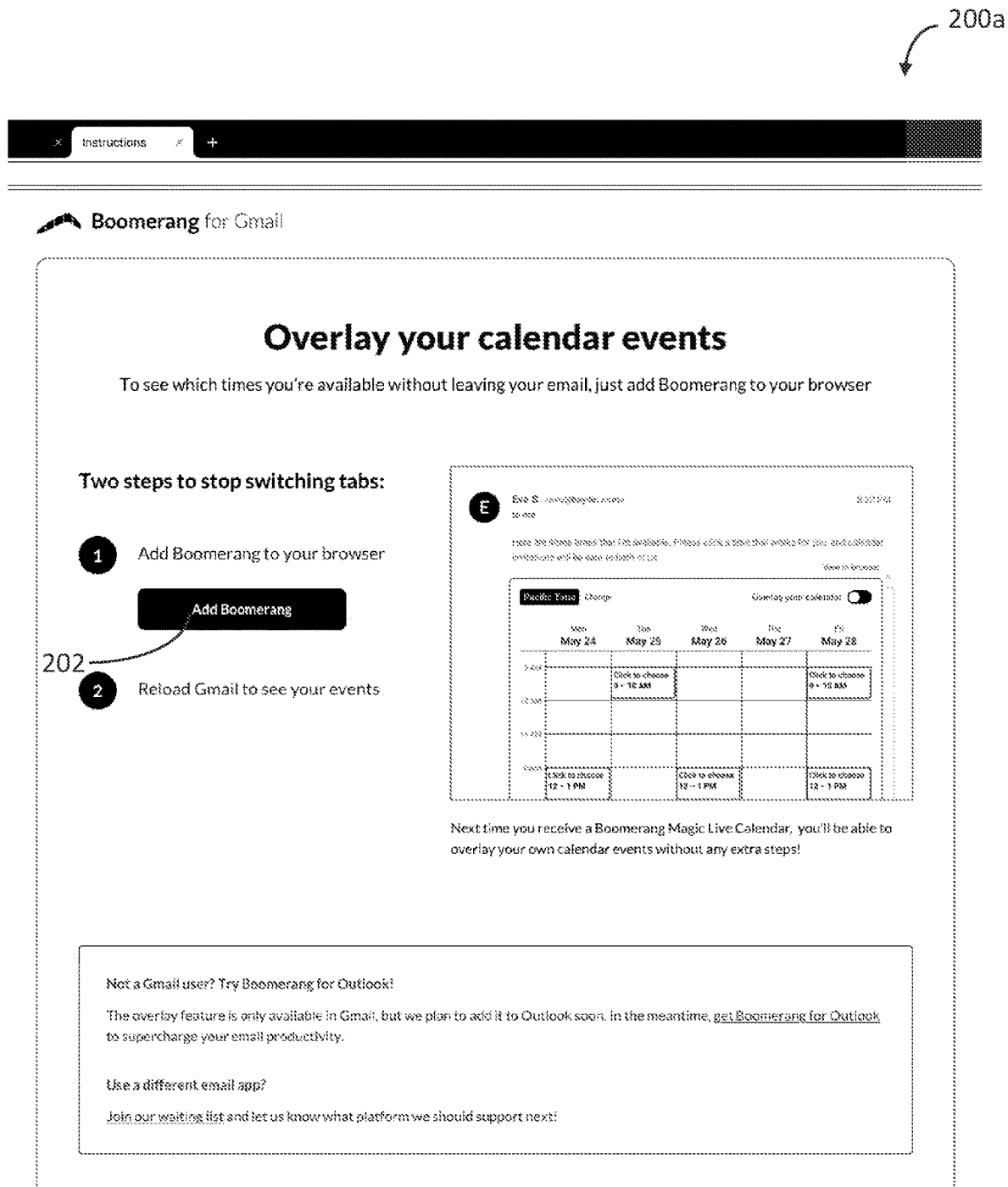
FIG. 2A depicts an example user interface for adding a calendar component to an electronic message application, in accordance with one or more implementations.

Referring briefly to FIG. 2A, depicted is an example user interface 200A for installing a calendar component 106

(referred to in the user interface 200A as "Boomerang") to be added to a web browser and to interact with a web-based email application (e.g., "Gmail"). As shown, the user interface 200A includes an interactive element 202, which when actuated causes the web browser to download the calendar component 106 (e.g., to the client device 102 of a sender or recipient of electronic messages). The calendar component 106 can be a browser plugin, a browser extension or an add-on software module, which can include computer-executable or computer-interpretable instructions that causes the client device 102 to perform any of the operations detailed herein. In some implementations, the calendar component 106 may be implemented as an original software component of the electronic message application 104. The calendar component 106 executing at a client device 102 of a sender can embed tags or other computer-readable code into the body of an electronic message, which can cause the electronic message application 104 and/or the calendar component 106 executing at the client device 102 of the recipient to request a generated image depicting calendar information of the sender and/or the recipient from the data processing system 114.

Figure 2B:
FIG. 2B depicts an example user interface for logging in to a service for providing calendar information and/or calendar functionalities within electronic messages, in accordance with one or more implementations.

Referring to FIG. 2B, a user interface 200b for logging in to a service for providing calendar information and/or calendar functionalities within electronic messages is depicted, in accordance with example implementations. In some implementations, the service or functionalities associated with the calendar component 106 can be accessed via a user account. In other words, a user (whether a sender or recipient of an electronic message) may need to login to a respective user account in order for the data processing system 114 to access respective calendar information. The calendar component 106, either at the sender's or recipient's client device, can present a login window 204 (e.g., pop-up window) to allow the user to login to the corresponding user account. In some implementations, the calendar component 106 can display the login window 204 to authenticate the user prior to inserting or embedding the tags in the electronic message, if the user is not logged in to the respective user account.

As shown in the user interface 200b of FIG. 2B, the pop-up window 204 (or another user interface) can request login details for an account used to access the functionality of the data processing system 114 and/or the calendar component 106. In some implementations, the calendar information may be maintained by a server or a computing system (e.g., that includes the calendar database 110) that is separate from the electronic messaging service (e.g., email) accessed by the electronic message application 104. The login window 204 can include fields to login to a user account for accessing functionalities of the calendar component 106 and/or the data processing system 114. In this example, the login window 204 includes the fields 206 that allow a user to enter account login information, and authorize the data processing system 114 and/or the calendar component 106 to access calendar information of the user (e.g., the sender or the recipient). The user interface 200b may be shown, for example, when the sender uses the calendar component 106 to embed tags in an electronic message, or when a recipient views an electronic message including the calendar information (e.g., calendar image) described herein.

Referring back now to FIG. 1, the electronic message application 104 can provide user interface elements that enable a user of the client device 102 to compose an electronic message, such as an email, an instant message, an online chat message, or a social networks message, among others. The electronic messaging application 104 can store data input by a user (e.g., via an input interface), while composing an electronic message. The electronic message application 104 may include computer code instructions to receive input data or input commands (e.g., a delete command) associated with composing an electronic message from an input interface (e.g., a keyboard, a mouse, or a touch screen) of the client device 102, and update data corresponding to the electronic message in the memory of the client device 102. For example, as the user composes an email message using the electronic message application 104 executing on the client device 102, the electronic message application 104 can cause the client device 102 to store data indicative of, for example, text input by the user as part of the email message body, text input as part of header fields (e.g., subject field, recipient field, or carbon copy field) of the email message, documents attached to the email message being composed, or a combination thereof. As the user composes the electronic message, the electronic message application 104 may cause the client device 102 to display a user interface or a message composing window presenting (or showing) the composed electronic message. In some implementations, the electronic message application 104 may be provided in part by an external messaging server (not pictured) via the network 112. For example, the electronic message application 104 may be a web-based email client that is accessed via a web browser executing on the client device 102.

When composing the electronic message, the user (e.g., sender) may activate the calendar component 106 to insert or add a calendar image in the body of the electronic message, for example, as computer-interpretable tags or markup language. In some implementations, the calendar component 106 can insert HTML code into the electronic message (or into HTML code of the electronic message), such as the example HTML code included below:

<table>
<span class="magic live calendar">
<img src="https://meet.boomerangapp.com/?id=63afawera352">
</span>
</table>

In the example HTML code provided above, the <table> tags define a region in the email body in which the image of the calendar image will be positioned, for example, once received from the data processing system 114. The <span> can operate as a class container, which can provide a flag indicating that an image depicting calendar information is included in the body of the email. The <img> tag includes a uniform resource indicator (URI) or a URL of a network location of the data processing system 114 or a computer server thereof, which can include an identifier of the calendar information or the corresponding image inserted into the electronic message by the calendar component 106.

When the sender activates the calendar component 106 to insert the calendar interface into the body of the email, the calendar component 106 can present one or more user interfaces (UIs) on a display of the client device that allow the client device 102 to specify, among other attributes, a time range (or time period) for the calendar information to be inserted in the electronic message, one or more identifiers of calendars of the sender, and one or more designated time slots to present in the calendar interface. Specifically, the sender can select time period (or time range) during which the sender wants to schedule a meeting, a conference call or other event with the intended recipient of the electronic message. In some implementations, the sender can select one or more calendars of the sender to be considered in scheduling the event. The sender may select a plurality of time slots designated by the sender for scheduling the event. In some implementations, the designated time slots may be determined from the one or more calendars of the sender. The designated time slots may can represent time slots during which the sender is available, time slots during which the sender is busy or time slots that are proposed by the sender via the user interfaces. In some implementations, the user interfaces can be provided by the data processing system 114 and/or the calendar component 106. All of this information (e.g., the time range or period, the available time slots, the one or more identifiers of calendars of the sender, the identifier of the sender, the identifier of the recipient(s), other information, etc.) can be referred to as "calendar creation information." The calendar component 106 executing on the client device 102 of the sender can retrieve sender's calendar information, for example, according to the selected time duration, the selected calendar(s) and/or the designated time slots, and generate an image depicting the sender's calendar information. The calendar component 106 executing on the client device 102 of the sender can cause display of the calendar interface (or calendar image) within the electronic message being composed.

Figure 2C:
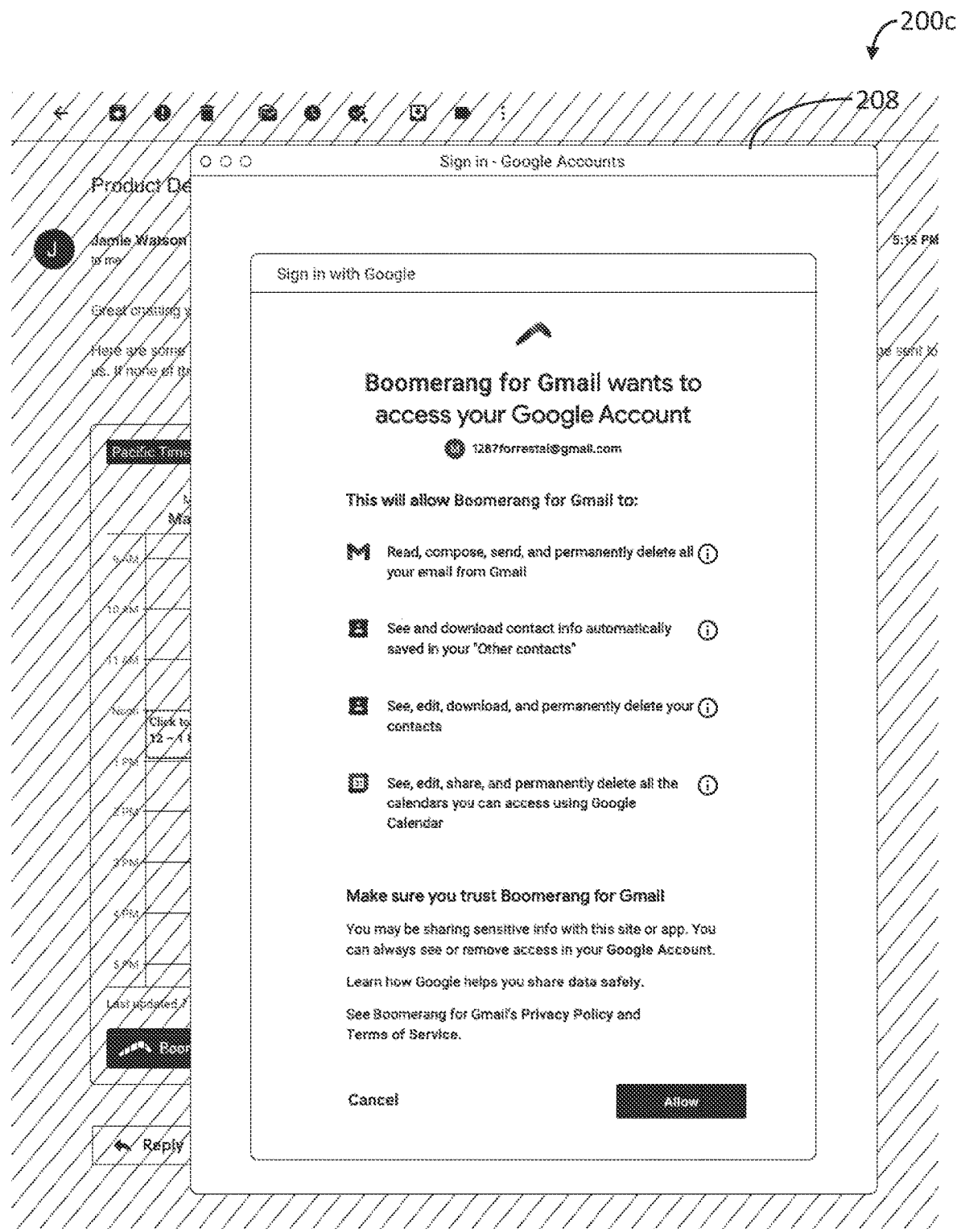
FIGS. 2C and 2D each depict example user interfaces for providing authorization to access calendar information, in accordance with one or more implementations.

Upon logging in to the user account, the calendar component 106 can allow the user to authorize the data processing system 214 and/or the calendar component to access user personal data, such as user calendar data. Referring now to FIG. 2C, a user interface 200c for providing access authorization is shown, according to example implementations. The user interface 200c can include an authorization (pop-up) window 208 that lists the types of user data or information for which access authorization is requested. The user interface 208 can include an interactive "Allow" icon and a "Cancel" icon to provide or deny authorization or permission to access the different types of user data or information. If the user selects the "Cancel" icon, the data processing system data processing system 114 and/or the calendar component 106 will not be authorized to access any of the user data or information listed in the authorization window 208. As s shown, the data processing system 114 and/or the calendar component 106 can be authorized to read, compose, edit, and delete email messages; see and download contact information; see, edit, and delete contacts; and see, edit, share, and delete calendars. In some implementations, the different types of user data shown I FIG. 2C can be selectable, such that the user can select which types user data the user is willing to provide access permission for. It should be understood that authorization for some of these activities may not be required to carry out all of the operations described herein.

Referring back now to FIG. 1, the electronic message application 104 executing at the client device 102 of the sender can send the composed electronic message to the recipient. The electronic message application 104 executing at the client device 102 of recipient can access the electronic message, which includes instructions (e.g., HTML code) indicative of the calendar interface (or calendar image) depicting sender's calendar information. Upon access of the electronic message, the electronic message application 104 and/or the calendar component 106 can detect or read the instructions or tags in the electronic message and transmit a request for the calendar image (depicting the sender's calendar information) indicated in the tags or instructions inserted in the of the electronic message. The calendar component 106 executing on the sender's client device 102 can generate the request using information retrieved from the electronic message. The request can include an indication or an identifier of the calendar image (depicting the sender's calendar information) or of calendar information of the sender. The request can include information about (or identifying) the recipient of the electronic message. For instance, the request can include an authentication header including sender's and/or recipient's information, such as sender's and/or recipient's email(s). The recipient's information can include an email address of the recipient extracted from the electronic message or a session cookie of the signed in recipient. The sender's information can include an email of the sender extracted from the electronic message or a session cookie of the signed in sender. The request can further include a tag or flag indicating that the calendar information of both the sender and recipient is requested or that the image is to include both the calendar information of the sender and the calendar information of the recipient. In some implementations, the data processing system 114 can interpret the existence of the recipient's information in the request as an indication that both the calendar information of the sender and the calendar information of the recipient are requested (or are to be included in the image).

Referring now to the operations of the data processing system 114, when the calendar component 106 on the sender's client device obtains the time duration, the selected sender's calendar(s) and/or any time slots sleeted by the sender, the calendar component 106 can send the calendar creation information to the data processing system 114. Upon receiving the calendar creation information from the client device 102 of the sender, the data processing system 114 can generate an identifier that identifies the sender's calendar information or a corresponding calendar image. The identifier can include a random value or a random or salted hash of the calendar creation information. The data processing system can create a data structure to store the identifier in association with the calendar creation information. In some implementations, the data processing system 114 can generate the calendar image depicting the sender's calendar information according to the calendar creation information, and generate the identifier to identify the generated calendar image. The data processing system can transmit the identifier and/or the calendar image to the client device 102 of the sender.

Upon receiving the request for the calendar information from the client device 102 of the recipient, the data processing system 114 or the identification module 116 can extract the information in the request, such as the identifier indicative of the calendar information of the sender and the information about the recipient. The data processing system 114 or the identification module 116 can identify the calendar information of the sender of the electronic message using the identifier of such information (or of the corresponding calendar image) extracted from the request. For instance, the data processing system 114 can maintain the data structure mapping the identifier of the sender's calendar information (extracted from the request) to the time period selected by the sender, the selected calendar(s) of the sender and/or any time slots designated by the sender. The time period selected by the sender, the selected calendar(s) of the sender and/or the designated time slots (if any) define the sender's calendar information to be retrieved by the data processing system 114 from the calendar database 110.

The data processing system 114 or the identification module 116 can use the information in the authentication header to authenticate the sender and/or the recipient of the electronic message. For example, the data processing system 114 or the identification module 116 can compare the recipient's information received in the request to the recipient's information stored in the data structure in association with the sender's calendar information identifier to authenticate the recipient or to a session cookie of the signed in recipient. If a match is detected, the data processing system 114 or the identification module 116 can determine the recipient to be authenticated. The data processing system 114 or the identification module 116 may The data processing system 114 or the identification module 116 may use the sender's information and/or the recipient's information extracted from the request to determine whether the sender and/or the recipient are logged in to their respective accounts, and/or to determine the access permissions associated with the sender and/or the recipient. The data processing system 114 or the identification module 116 can identify calendar information of the recipient of the electronic message, using the identifier of the sender's calendar information and the information about the recipient of the electronic message. Specifically, the data processing system 114 or the identification module 116 can use the recipient's information to identify one or more calendars of the recipient from which to retrieve the recipient's calendar information. The one or more calendars of the recipient may be selected by the recipient at an earlier stage (e.g., when setting the recipient's account). The data processing system 114 or the identification module 116 can use the time period selected by the sender and/or the selected recipient's calendar(s) to determine the calendar information of the recipient to be retrieved from the calendar database 110. The calendar information of the recipient can correspond to the time period selected by the sender.

If the data processing system 114 is authorized, the data generating module 118 can retrieve the calendar information of the sender and the calendar information of the recipient corresponding to the time period (e.g., in the calendar creation information) selected by the sender, for example, from one or more calendar databases 110. In some implementations, the data generating module 118 can access one or more of the calendar databases 110 using one or more APIs associated with the one or more calendar databases 110, and retrieve the calendar information of the sender and the calendar information of the recipient.

Upon retrieving the calendar information of both the sender and recipient, the data generation module 118 can automatically generate an image depicting the calendar information of both the sender and the recipient of the electronic message. In some implementations, the data generating module 118 generates an image depicting the calendar information of both the sender and the recipient, upon determining (e.g., based on the flag included in the request) that the request is a request for a calendar image showing the calendar information of both the sender and the recipient. In some implementations, the data generating module 118 may generate two images: one calendar image that includes the calendar information of the sender only, and a second image that includes both the calendar information of the sender and the recipient. The data generating module 118 can generate the image of the calendar, for example, using dynamic drawing rules according to the specified time period. For example, the data generating module 118 may first generate the image by allocating a predetermined number of pixels for the image. The data generating module 118 can then apply drawing rules to draw an outline of a calendar by modifying the pixels (e.g., changing the colors at determined coordinates according to the drawing rules, etc.). The drawing rules can specify relative positions and sizes of days shown in the calendar, positions and sizes of various interface elements, or other information usable to produce an image of a calendar.

Figure 2D:
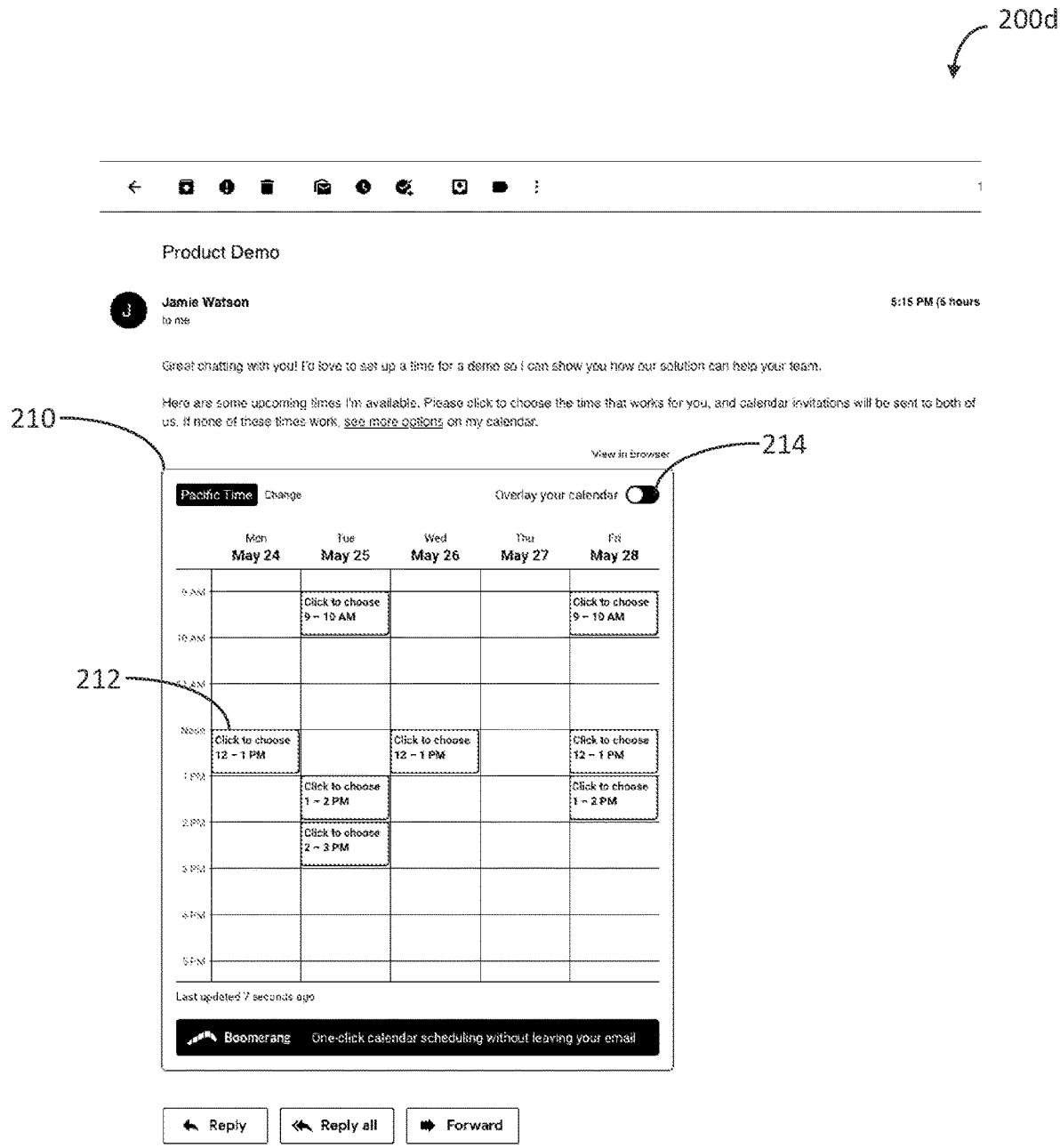

For example, the drawing rules can indicate the widths and heights to draw the rectangles representing each day, hour (or other determine time segment) in the image. Once these rules have been applied, a grid can be produced that can accommodate the time period specified in the calendar creation information. The data generating module 118 can then add text, for example, using font drawing techniques. The location of the text can be positioned to identify each of the rectangles in the grid making up the calendar in the image. For example, as shown in FIG. 2D, the text identifying each day in the five day time period is centered above the rectangles that identify each day. Likewise, the hours are located on the left hand side of the image at each line designating the next hour in the day. The data generating 118 can execute drawing rules that include corresponding text (e.g., identifying days and hours or other time indicators) at appropriate relative positions to identify the time period represented by the grid.

Once the grid and identifying text information have been drawn, the data generating 118 can draw the designated time slots corresponding to the sender. As described herein above, the designated time slots of the sender can be, for example, time slots selected by the sender in the calendar creation information, time slots identified in the calendar information of the sender as available time slots, or time slots identified in the calendar information as busy time slots. The time slots can be, for example, rectangles having a size that is determined to fit within the positions in the grid drawn by the data generating module 118. The position of each rectangle can be determined according to the positions in the grid to which each of the time slots correspond. In some implementations, the data generating module 118 can draw a text label over each rectangle that indicates a time slot. For example, the text label can indicate the respective time range for the time slot, and may include text such as "Click to choose," as shown in FIG. 2D.

When generating a calendar image that also includes the calendar information of the recipient, the data generating module 118 can perform similar operations corresponding to meetings, appointments, or busy periods identified in the calendar information of the recipient. For example, for each time period that the recipient is in a meeting, an appointment, or is otherwise busy, the data generating module 118 can generate a respective rectangle having a size and position that reflects the respective meeting, appointment, or busy period. The data generating module 118 can draw calendar entries (e.g., rectangles representing time slots) for the recipient to at least partially overlap corresponding calendar entries for the sender. In some implementations, the data generating module 118 may adjust the positions and/or sizes of the recipient calendar entries to avoid fully occluding and obscuring calendar entries of the sender. In some implementations, the data generating module 118 can adjust the opacity (e.g., modifying the alpha-channel of the pixels to a predetermined value, etc.) of the recipient calendar entries such that the sender calendar entries are still visible beneath the recipient calendar entries. In some implementations, the alpha channels of the pixels corresponding to the recipient calendar entries may all be set to semi-transparent values, such that any potential overlapping areas remain visible. In some implementations, the data generating module 118 can generate the calendar entries of the recipient as an overlay configured to be displayed on the calendar image depicting only sender's calendar information. The overlay can be viewed as a second image that is used in combination with the image including the calendar entries of the sender to create a single overlay image.

In some implementations, the data generating module 118 can generate an image map to allow interaction with the generated calendar image(s). The image map can include, for example, HTML, code that references remotely stored content or data at the data processing system 114. In some implementations, the HTML code can include one or more links, scripts, or other information that cause the electronic message application 104 of the recipient to transmit a request to schedule a meeting for a selected time period. The selected time period can correspond to the portion of the image map with which the user interacted (e.g., one of the available time slots indicated in the calendar image, etc.). Each slot can be associated with a URL, which when selected transmits a request to the data processing system 114 to create a calendar invite with the sender and the recipient as attendees. In some embodiments, the graphical representation of the user's availability may include HTML capable of detecting one or more interactions by the recipient on the graphical representation. In some implementations, the calendar image depicting the sender's availability may include the image map. The image map overlay may provide additional information about the tentative time periods selected by the sender of the electronic message. In some implementations, an image map may allow the recipient to interact with the calendar image when the slices of the calendar image are selected (e.g., via user input).

The image map can include a number of selectable regions or slices, each of which corresponds to a respective time slot (or calendar entry) in the calendar image(s). The image map can be viewed as an overlay to be displayed over the generated calendar image(s) and to allow for interaction with the calendar image(s), e.g., when displayed on the client device 102. The image map can include a plurality of URLs (or URIs), each of which can be associated with a corresponding selectable region or slice of the image calendar. Each URL (or URI) can correspond to a respective calendar time slot that is aligned with the corresponding selectable region or slice, and can include, for example, an identifier of the time slot, the sender, the recipient, or the calendar image, among others. Each URL (or URI) can represent a request that is sent to the data processing system 114 when the corresponding selectable region or slice is interacted with (or selected) at the client device 102 of the recipient. As such, the recipient can select a time slot (e.g., by selecting the corresponding selectable region/slice in the image map) to schedule a meeting, an appointment, call or other event with the sender.

The data processing system 114 or the communication interface 120 can send instructions to the client device 102 of the recipient to cause display of the generated calendar image(s) within the electronic message accessed by the client device 102 of the recipient. The instructions can include the generated calendar image(s) or an indicator thereof (e.g., a link from which to download the image(s)). In some implementations, the communication interface 120 can provide access to both the first image (depicting only sender's calendar information) and the second image (depicting both sender's and recipient's calendar information) to the client device 102 of the recipient. In some implementations, the communication interface 120 can provide access to (e.g., send) the second image (depicting both sender's and recipient's calendar information) if the flag in the request indicates that calendar information for both the sender and recipient are requested, otherwise the communication interface 120 can provide access to the first image (depicting only sender's calendar information). The data processing system 114 or the communication interface 120 can send (or provide access of) the image map to the client device 102 of the recipient via the network 112.

If an interaction occurs at the client device 102 with one of the selectable slices/regions in the image map, the client device 102 can transmit the corresponding URL as a request to the data processing system 114 that identifies the time slot associated with the selected slice/region. The data generating module 118 can receive the URL or an indication thereof, and determine the time slot selected at the client device 102 based on the URL. For example, the URL can include an identifier of the respective time slot to which the URL corresponded, or can indicate a specific time period. The data generating module 118 can use the information in the URL to identify the time slot to which the URL corresponds (e.g., using a lookup table or other data structure), and determine whether the time slot is adequate for scheduling the event. The data processing system 114 or the data generating module 118 can subsequently send a response message to the client device 102 of recipient based on the determination of whether the time slot is adequate for scheduling the event. For example, if either the sender or the recipient are not available at the selected time slot, the data generating module 118 can transmit a response to the calendar component 106 of the recipient that instructs the calendar component 106 to display an error message (e.g., "That time slot is unavailable," etc.). If both the sender and recipient are available (or free) at the time slot, the data generating module 118 can generate a response message to cause the client device 102 of the recipient to schedule the event between the sender and the recipient at the selected time slot.

In some implementations, the response message from the data processing system 114 to the client device 102 of the recipient can cause the client device 102 generate a calendar invite, for example, in a standard calendar invitation format (e.g., an iCalendar (ICS) format file, etc.), if both the sender and recipient are available at the selected time slot. The calendar invite file can be generated to include schedule the event at the selected time slot, and includes both the sender and recipient as participants. In some implementations, the calendar invite file can be generated at the data processing system 114, e.g., by the data generating module 118, and sent to the client device 102 of the recipient. In some implementations, the calendar invite file can be generated at the client device 102 of the recipient, e.g., by the calendar component 106, responsive to instructions in the response message received from the data processing system 114. For example, the data generating module 118 may transmit relevant information for the calendar invite (e.g., sender and recipient identifiers, selected meeting time, etc.) to the calendar component 106 of the recipient client device 102. The calendar component 106 can receive the calendar information in the response message, and generate the calendar invite message to send to the sender. For instance, the calendar component 106 can interact with a calendar application at the client device 102 of the recipient to generate and display the calendar invite.

Upon receiving the response message, the calendar component 106, the electronic message application 104 or the calendar application on the client device 102 of the recipient can present the calendar invite file to the recipient in a user interface or pop-up window, such that the recipient is able to modify the metadata of the calendar invite (e.g., the meeting title, add additional participants, add a message body, etc.).

The calendar component 106 can then utilize the functionality of the electronic message application 104 or the calendar application to transmit the generated calendar invite to the sender (e.g., as part of an email message, etc.). For instance, the calendar invite can include an interactive icon for sending the calendar invite. The recipient can actuate or interact with the icon to send the calendar invite to the sender of the electronic message. The calendar components 106 or the calendar application on the client device 102 of the recipient may then update the calendar information associated with the recipient. An example of a calendar image depicting only sender's calendar information and displayed with the body of an electronic message is depicted in FIG. 2D. As shown in FIG. 2D, the user interface 200D shows an example calendar image 210, depicting only sender's calendar information, displayed within the body of an electronic message (e.g., an email message). The body of the electronic message includes text composed by the sender, and the calendar image 210, which depicts a time period of May 24 to May 28, and various time slots 212 selected by the sender of the email. In addition, the text at the bottom of the generated calendar image indicates that the calendar information was "last updated 7 seconds ago," thereby reflecting that the calendar information of the sender is up-to-date. The calendar information in the calendar image 210 can be retrieved from the sender's calendar(s) at the time the electronic message is accessed at the client device 102 of the recipient. In some implementations, the image map can correspond to each of the selectable time slots 212, such that when the user selects a time slot 212, a respective URL is activated that transmits a request to the data processing system 114 to create a calendar invitation for the selected time period. In addition, the calendar image includes a toggle button 214 that allows the recipient to overlay their own calendar information, for example, if authorization to access the calendar information of the recipient is provided to the data processing system 114 and/or the calendar component 106.

The recipient can access the calendar component 106 and/or the data processing system 114 by using one or more user interfaces as described herein. For example, in some implementations, if the user selects the toggle or interactive icon 214 (e.g., sliding bar) and does not have the calendar component 106 installed or integrated with electronic message application 104, the electronic message application 104 can be redirected to the interface shown in FIG. 2A to install the calendar component 106. Likewise, if the user selects the toggle or interactive icon 214 and the calendar component 106 or the data processing system 114 does not have authorization to access the calendar information of the user, the electronic message application 104 or the calendar component 106 can display a user interface that requests authorization to access one or more calendars of the user. Examples of such interfaces are shown in FIG. 2B.

Once the calendar component 106 and/or the data processing system 114 are authorized to access the calendar information of the user, and the toggle or interactive icon 214 has been selected by the recipient to show their calendar information with the calendar information of the sender, the electronic message application 104 and/or the calendar component 106 can replace the calendar image 210 with another calendar image depicting both the sender's and recipient's calendar information. For example, the electronic message application 104 and/or the calendar component 106 can receive both calendar images from the data processing system 114, and store them in a memory e.g., cache memory. The electronic message application 104 and/or the calendar component 106 can switch between the two calendar images (e.g., replace the calendar image displayed in the body of the electronic message with the other calendar image) responsive to actuation of (or interaction with) the toggle or interactive icon 214.

In some implementations, the calendar component 106 can transmit a new request for a new calendar information (or a new calendar image) to the data processing system 114 each time the recipient interacts with (or actuates) the toggle or interactive icon 214. The request can include, for example, an indication of one or more authorized calendars (e.g., an identifier of one or more calendars that the data processing system 114 is authorized to access, etc.), or an identifier of a calendar that the recipient intends to overlay over the sender calendar information, among other information as described in greater detail herein. In response, the data processing system 114 can transmit a new calendar image that includes the specified calendar information (e.g., calendar information of the recipient with the calendar information of the sender), thereby allowing the recipient to make information scheduling decisions without accessing an external calendar application. The calendar component 106 can cause the new calendar image to be displayed in the place of (e.g., as a replacement for) the first image that displayed just the calendar information of the sender in the body of the electronic message. The second image can be seamlessly presented as part of the body of the electronic message. Because the image is generated at the data processing system 114 (as described in greater detail herein, etc.), the calendar information for both the sender and the recipient reflects up-to-date information accessed by the data processing system 114.

In some implementations, the second calendar image may not be a replacement for the first image that depicts the sender information, but may be a semi-transparent overlay image that the calendar component 106 can position over the first image. In such implementations, the second image can include an alpha-channel at each pixel having values that makes portions of the second image either transparent or semi-transparent, such that portions of other content (e.g., the first image) are still visible even when the second image is positioned over the other content. The calendar component 106 can switch between displaying or not displaying the overlay depicting the recipient's calendar data responsive to the recipient interacting with the toggle 214.

Figure 2E:
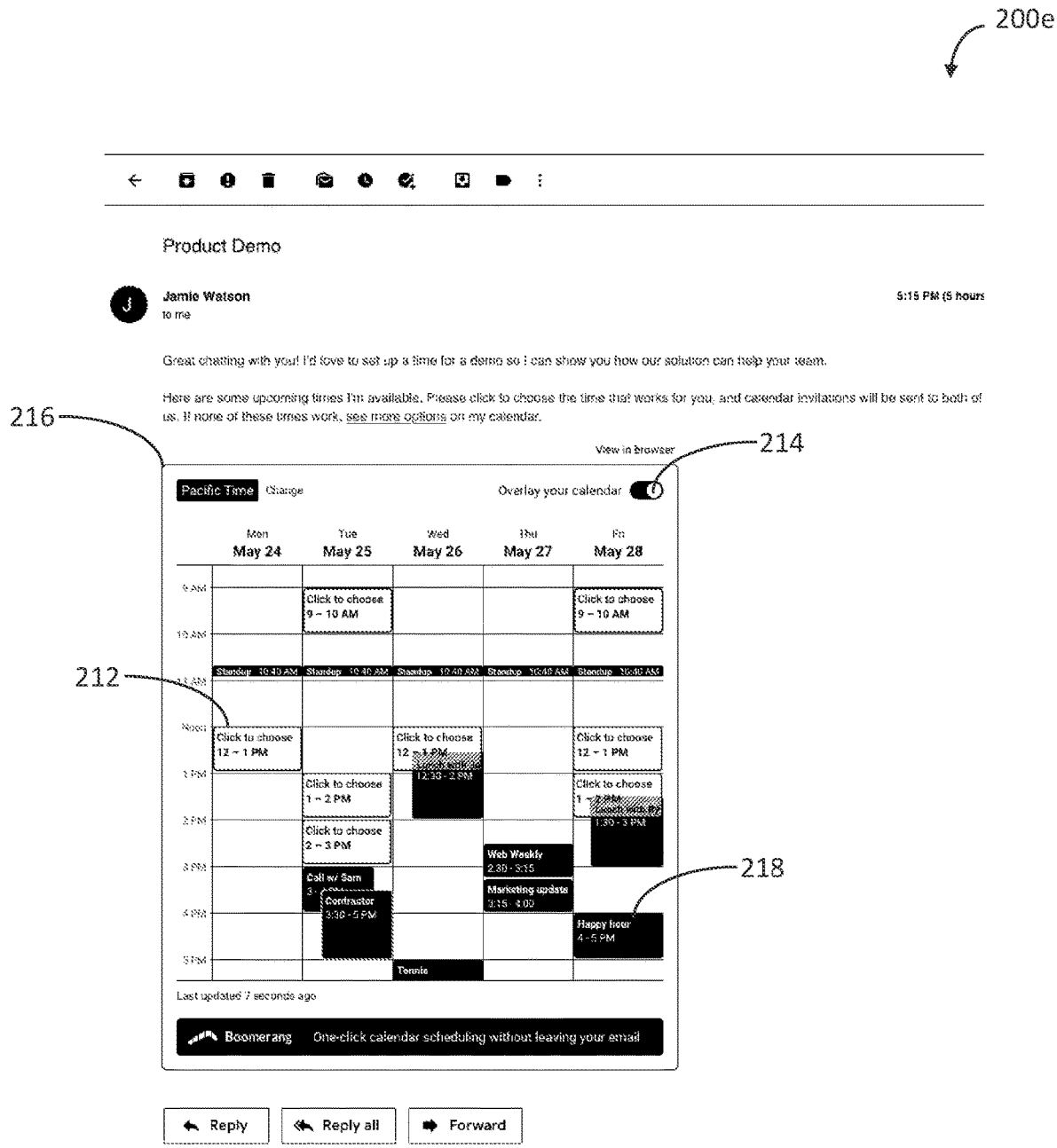
FIG. 2E depicts an example electronic message displaying both calendar information of a recipient and the calendar information of a sender, in accordance with one or more implementations.

An example of the second image showing both the calendar information of the sender and the calendar information of the recipient is shown in FIG. 2E. As shown in the user interface 200E, the second image 216 is positioned at the same location in the email body as the first image (e.g., the image 210 shown in FIG. 2B), and the toggle button 214 has toggled its status following the interaction by the user. The second image includes the same available time periods 212 as the first image. However, the second image also includes the second calendar information 218, which shows the details of the user's (e.g., the recipient's) calendar over the time period indicated in the first image. Like the first image 210, the second image 216 can be displayed in connection with a "view in browser" link, which when actuated by a user directs a web browser to open the calendar information displayed in the first image 210 or the second image 216 in a web browser. As shown, the second image 216 can be generated such that the recipient's calendar information 218 appears semi-transparent when overlaying the selectable available timeslots 212.

Figure 3:
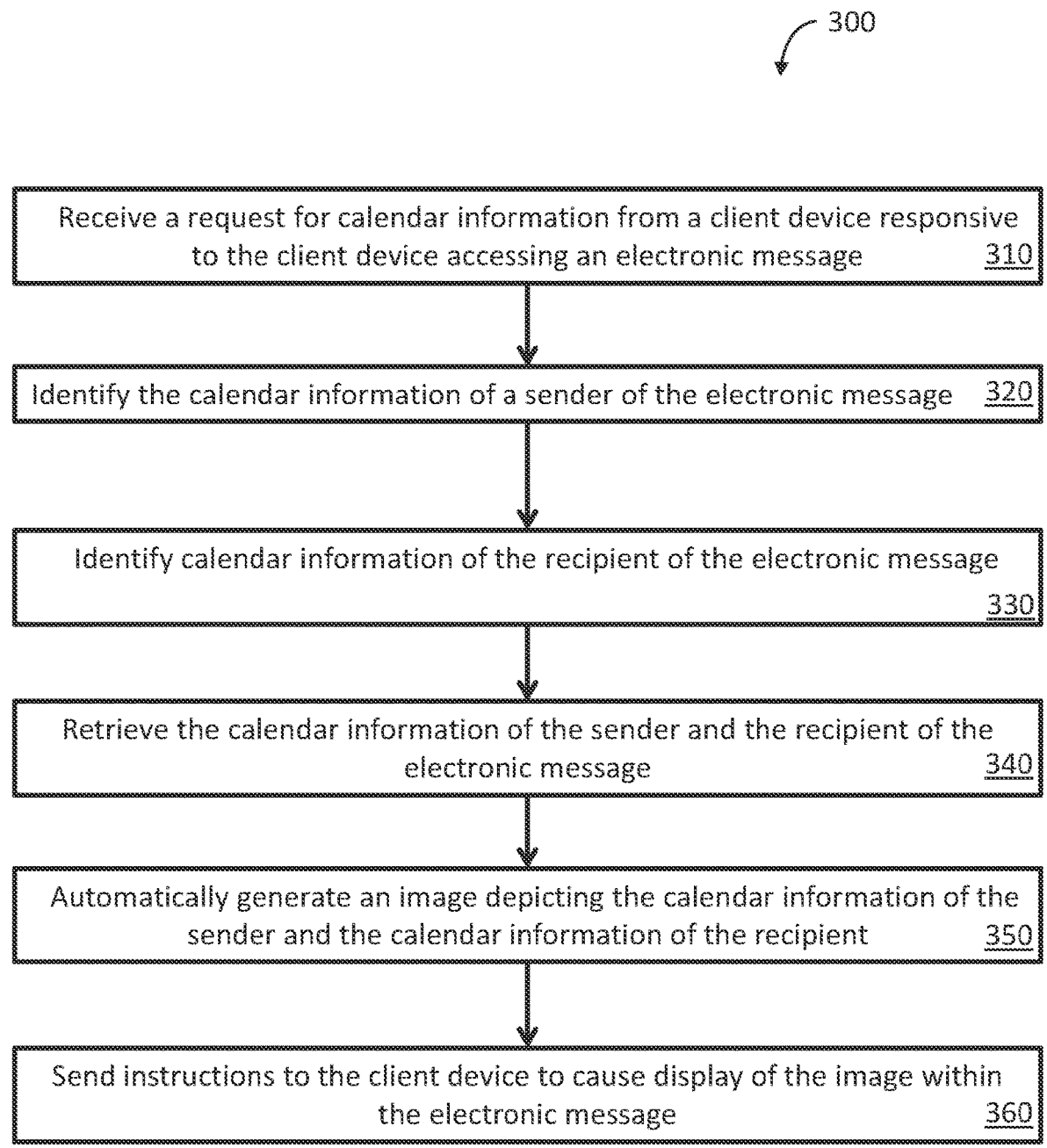
FIG. 3 illustrates an example flow diagram of a method for presenting calendar information in electronic messages, in accordance with one or more implementations.

Referring now to FIG. 3, depicted is an illustrative flow diagram of a method 300 for presenting calendar information in electronic messages. The method 300 can be executed, performed, or otherwise carried out by the data processing system 114, the computer system 400 described herein in conjunction with FIG. 4, or any other computing devices described herein. In brief overview of the method 300, the data processing system 114 can receive a request for calendar information from a client device (e.g., a client device 102) responsive to the client device accessing an electronic message (STEP 310), identify the calendar information of a sender of the electronic message (STEP 320), and identify calendar information of the recipient of the electronic message (STEP 330). The data processing system 114 can retrieve the calendar information of the sender and the recipient of the electronic message (STEP 340), and automatically generate an image depicting the calendar information of the sender and the calendar information of the recipient (STEP 350). The data processing system 114 can send instructions to cause display of the image within the body of the electronic message accessed at the client device (STEP 360).

In further detail of the method 300, the data processing system 114 can receive a request for calendar information for display in an electronic message responsive to the client device 102 accessing the electronic message (STEP 310). The request can be initiated, for example, when the client device 102 of a recipient of an electronic message accesses the electronic message. The electronic message can include embedded tags that reference the data processing system 114. The electronic device 102 can access the electronic message via an electronic message application, such as the electronic message application 104 of the client device. Upon accessing the electronic message, the client device of the recipient transmits a corresponding request for calendar information or a calendar image, e.g., according to a URI embedded in the body of the email as described herein. The data processing system 114 can receive the request for the calendar information. The request can include an identifier identifying a calendar image depicting sender's calendar information of the sender of the electronic message. The client device of the recipient can request the image for display in the electronic message accessed by the client device of the recipient. As described herein, the request can include information about the recipient of the electronic message. The recipient's information can include an email address of the recipient extracted from the electronic message or a session cookie of the signed in recipient. The information about the recipient of the electronic message (e.g., the recipient email address or session cookie) can be compared to the identifier of the recipient associated with the identifier of the calendar information. If the recipient information matches the identifier or other information of the recipient maintained or accessible by the data processing system 114, then the recipient is authorized to view the requested calendar information, and the operations of the data processing system 114 can proceed as described herein. If the recipient information does not match the identifier or other information of the recipient maintained or accessible by the data processing system 114, then the data processing system 114 can transmit an error message to the requesting client device. In some implementations, the request can include an authentication header, which can include recipient information and/or sender's information for us by the data processing system 114 to authenticate the recipient and/or the sender. The sender's information can include an email of the sender extracted from the electronic message or a session cookie of the signed in sender.

The data processing system 114 can identify the calendar information of the sender of the electronic message (STEP 320). Upon receiving the request, the data processing system 114 can identify the calendar information of the sender according to the identifier received in the request. As described herein, when generating the identifier that identifies the calendar image or calendar creation information, the data processing system 114 can store the identifier in a data structure in association with the calendar creation information. When the data processing system 114 receives the identifier of the calendar image or the calendar creation information, the data processing system 114 can use the identifier as a lookup value for the calendar creation information (e.g., stored in the data structure or in a memory of the data processing system 114). In accessing the calendar creation information, the data processing system 114 can identify the one or more calendars of the sender for the electronic message, the time period for the calendar image, and/or one or more designated time slots within the time period. In some implementations, the data processing system 114 can access the calendar information of the sender to determine the time slots by retrieving any scheduled appointments, meetings, or other busy periods indicated in the calendar information for the sender from a calendar database (e.g., the calendar database(s) 110) using the time period as a lookup range. In some implementations, from the retrieved calendar information, the data processing system 114 can identify the time slots as periods that the sender is available, or as periods that the sender is busy.

The data processing system 114 can identify calendar information of the recipient of the electronic message (STEP 330). The data processing system 114 can also identify the calendar information for the recipient of the electronic message. To do so, the data processing system 114 can determine whether the recipient has authorized the data processing system 114 to access the calendar information of the recipient (e.g., by accessing one or more identifiers, authorization tokens, digital certificates, or other indications that the recipient has authorized the data processing system 114 to access the calendar information of the recipient). If the data processing system 114 is not authorized, the data processing system 114 can transmit a corresponding indication to a calendar component (e.g., the calendar component 106) at the client device 102. In some implementations, the data processing system 114 can display one or more user interfaces at the client device to request access to the calendar information, such as the user interfaces shown in FIGS. 2B and 2C. The data processing system 114 can use the time period and/or the one or more designated time slots indicated in the calendar creation information to determine a relevant portion of the recipient calendar information. Specifically, the data processing 114 determine the relevant calendar information of the recipient as the recipient's calendar information within the time period and/or overlapping with any designated time slots.

The data processing system 114 can retrieve the calendar information of the sender of the electronic message and the calendar information of the recipient of the electronic message (STEP 340). If the data processing system 114 is authorized, the data processing system 114 can retrieve up-to-date calendar information of the sender and up-to-date calendar information of the recipient within the time period and/or within designated slots (e.g., indicated in the calendar creation information), for example, from one or more of the calendar databases. In some implementations, the data processing system 114 can access one or more of the calendar databases using one or more APIs associated with the one or more calendar databases. If the calendar information of the recipient is stored locally at the client device of the recipient, the data processing system 114 can retrieve the calendar information from the client device, for example, by transmitting a request for the calendar information to the calendar component at the client device of the recipient. In response, the calendar component can access the locally stored calendar information according to the specified time period and/or specified designated time slots, and transmit it to the data processing system 114.

The data processing system 114 can automatically generate an image depicting the calendar information of the sender of the electronic message and the calendar information of the recipient of the electronic message (STEP 350). The data processing system 114 can automatically generate an image depicting the calendar information of the sender of the electronic message. If the request indicates a request for an image of a calendar showing both the calendar information of the sender and the recipient, the data processing system 114 can generate a calendar image including the calendar information of the recipient. The data generating 118 may generate two images: one image that includes the calendar information of the sender, and a second image that includes both the calendar information of the sender and the recipient. The data processing system 114 can generate the calendar image, for example, using dynamic drawing rules according to the specified time period. For example, the data processing system 114 may first generate the image by allocating a predetermined number of pixels for the image. The data processing system 114 can then apply drawing rules to draw an outline of a calendar by modifying the pixels (e.g., changing the colors at determined coordinates according to the drawing rules, etc.). The drawing rules can specify relative positions and sizes of days shown in the calendar, positions and sizes of various interface elements, or other information usable to produce an image of a calendar.

For example, the drawing rules can indicate the widths and heights to draw the rectangles representing each day, hour (or other determine time segment) in the image. Once these rules have been applied, a grid can be produced that can accommodate the time period specified in the calendar creation information. The data processing system 114 can then add text, for example, using font drawing techniques. The location of the text can be positioned to identify each of the rectangles in the grid making up the calendar in the image. For example, as shown in FIG. 2D, the text identifying each day in the five day time period is centered above the rectangles that identify each day. Likewise, the hours are located on the left hand side of the image at each line designating the next hour in the day. The data processing system 114 can execute drawing rules that include corresponding text (e.g., identifying days and hours or other time indicators) at appropriate relative positions to identify the time period represented by the grid.

Once the grid and identifying text information have been drawn, the data processing system 114 can draw the designated time slots corresponding to the sender. As described herein above, the designated time slots of the sender can be, for example, time slots selected by the sender in the calendar creation information, time slots identified in the calendar information of the sender as available time slots, or time slots identified in the calendar information as busy time slots. The time slots can be, for example, rectangles having a size that is determined to fit within the positions in the grid drawn by the data processing system 114. The position of each rectangle can be determined according to the positions in the grid to which each of the time slots correspond. In some implementations, the data processing system 114 can draw a text label over each rectangle that indicates a time slot. For example, the text label can indicate the respective time range for the time slot, and may include text such as "Click to choose," as shown in FIG. 2D.

When generating a calendar image that also includes the calendar information of the recipient, the data processing system 114 can perform similar operations corresponding to meetings, appointments, or busy periods identified in the calendar information of the recipient. For example, for each time slot that the recipient is in a meeting, an appointment, or is otherwise busy, the data processing system 114 can generate a respective rectangle having a size and position that reflects the respective meeting, appointment, or busy time slot. The data processing system 114 can draw the rectangles for the recipient, for example, on a separate layer that is on top of the other layers in the image. If the size and location of a rectangle corresponding to the recipient calendar information overlaps another rectangle of another calendar entry (e.g., of the recipient or the sender), the data processing system 114 may adjust the position or size of the recipient rectangle so as to minimize the amount by which the recipient rectangle occludes the other calendar entries.

In addition, if the rectangle corresponding to a recipient calendar entry overlaps a calendar entry corresponding to a sender, the data processing system 114 can adjust the opacity (e.g., modifying the alpha-channel of the pixels to a predetermined value, etc.) of the recipient calendar entry such that the sender calendar entry is still visible beneath the recipient calendar entry. In some implementations, the alpha channels of the pixels corresponding to the recipient calendar entries may all be set to semi-transparent values, such that any potential overlapping areas remain visible. In some implementations, the data processing system 114 can generate the overlay including the calendar entries of the recipient as a second image. In some implementations, the second image can be combined with the image including the calendar entries of the sender to create a single overlay image as shown in FIG. 2E. In some implementations, the second image and the image including the calendar entries of the sender may be transmitted separately and combined into a single viewing area by the calendar component.

The data processing system 114 can provide the calendar image to the client device for display within the electronic message (STEP 360). In some implementations, the data processing system 114 can provide both the first image and the second image to the client device of the recipient. In some implementations, the data processing system 114 can generate an image map, as described herein, which includes a number of selectable regions each of which corresponds to a respective time slot for the sender. The data processing system 114 can generate a respective URL (or URI) for each selectable region. The URL can correspond to the respective time slot represented by the selectable region, and can include, for example, an identifier of the time slot, the sender, the recipient, or the calendar image, among others. In this way, the recipient can select one of the selectable regions in the image map, which includes a URL that identifies the respective time slot, to request a meeting or appointment at the selected time. The data processing system 114 can transmit the image map with the image to the client device 102.

If an interaction occurs at the client device 102 with one of the selectable slices/regions in the image map, the client device 102 can transmit the corresponding URL as a request to the data processing system 114 that identifies the time slot associated with the selected slice/region. The data processing system 114 can receive the URL or an indication thereof, and determine the time slot selected at the client device 102 based on the URL. For example, the URL can include an identifier of the respective time slot to which the URL corresponds, or can indicate a specific time period. The data processing system 114 can use the information in the URL to identify the time slot to which the URL corresponds (e.g., using a lookup table or other data structure), and determine whether the time slot is adequate for scheduling the event. The data processing system 114 can subsequently send a response message to the client device 102 of recipient based on the determination of whether the time slot is adequate for scheduling the event. For example, if either the sender or the recipient are not available at the selected time slot, the data processing system 114 can transmit a response to the calendar component 106 of the recipient that instructs the calendar component 106 to display an error message (e.g., "The time slot is unavailable," etc.). If both the sender and recipient are available (or free) at the time slot, the data processing system can generate a response message to cause the client device 102 of the recipient to schedule the event between the sender and the recipient at the selected time slot.

In some implementations, the response message from the data processing system 114 to the client device 102 of the recipient can cause the client device 102 to generate a calendar invite, for example, in a standard calendar invitation format (e.g., an iCalendar (ICS) format file, etc.), if both the sender and recipient are available at the selected time slot. The calendar invite file can be generated to include schedule the event at the selected time slot, and includes both the sender and recipient as participants. In some implementations, the calendar invite file can be generated at the data processing system 114 and sent to the client device 102 of the recipient. In some implementations, the calendar invite file can be generated at the client device 102 of the recipient, e.g., by the calendar component 106, responsive to instructions in the response message received from the data processing system 114. For example, the data processing system 114 may transmit relevant information for the calendar invite (e.g., sender and recipient identifiers, selected meeting time, etc.) to the calendar component 106 of the recipient client device 102. The calendar component 106 can receive the calendar information in the response message, and generate the calendar invite message to send to the sender. For instance, the calendar component 106 can interact with a calendar application at the client device 102 of the recipient to generate and display the calendar invite.

Upon receiving the response message, the calendar component 106, the electronic message application 104 or the calendar application on the client device 102 of the recipient can present the calendar invite file to the recipient in a user interface or pop-up window, such that the recipient is able to modify the metadata of the calendar invite (e.g., the meeting title, add additional participants, add a message body, etc.). The calendar component 106 can then utilize the functionality of the electronic message application 104 or the calendar application to transmit the generated calendar invite to the sender (e.g., as part of an email message, etc.). For instance, the calendar invite can include an interactive icon for sending the calendar invite. The recipient can actuate or interact with the icon to send the calendar invite to the sender of the electronic message. The calendar components 106 or the calendar application on the client device 102 of the recipient may then update the calendar information associated with the recipient.

Figure 4:
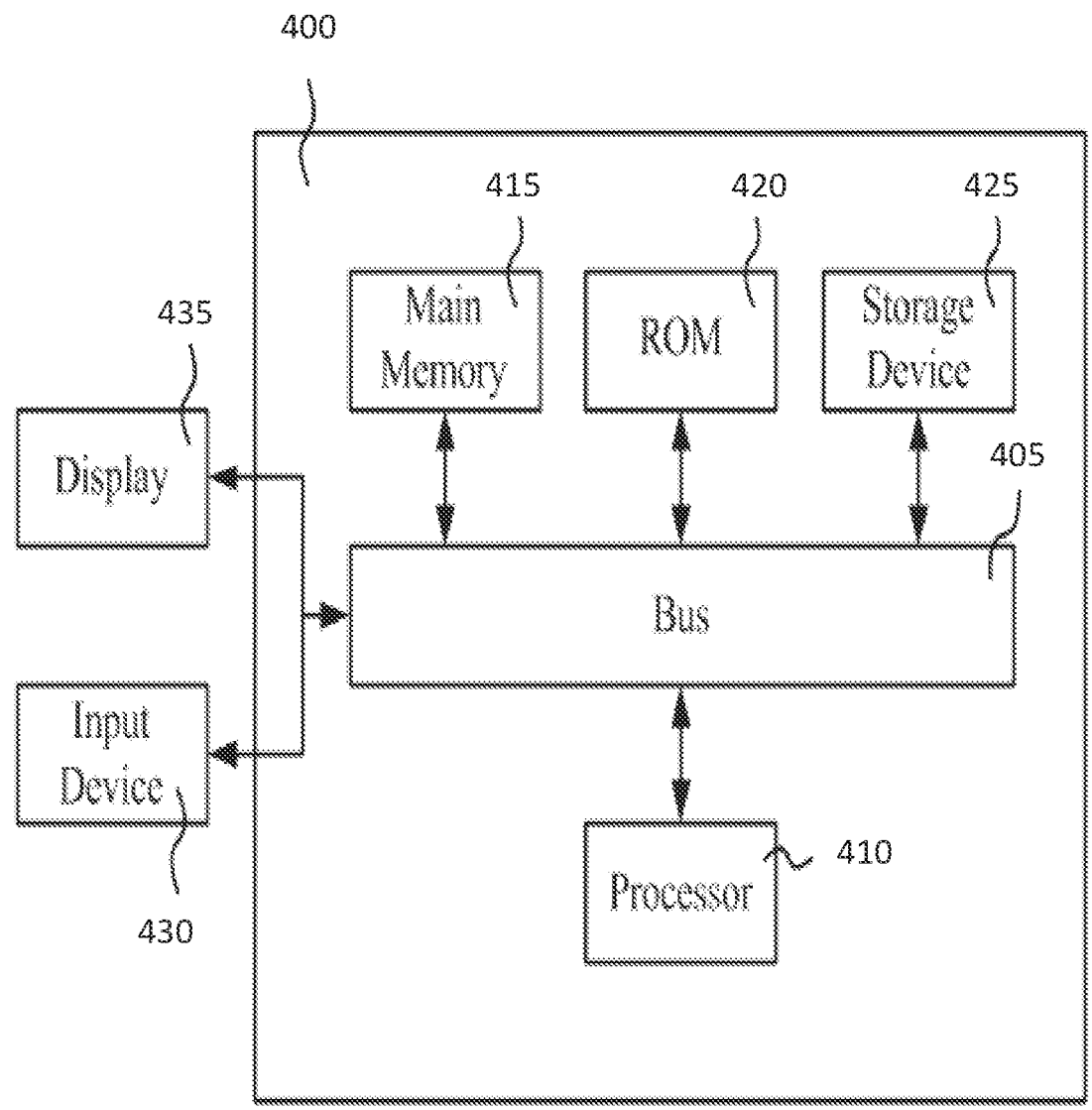
FIG. 4 is a block diagram depicting an implementation of a general architecture for a computer system that may be employed to implement various elements of the systems and methods described and illustrated herein.

FIG. 4 is a block diagram of a computer system 400 that can be used to implement the client device 102, the computer server(s) of the data processing system 114, and other components described herein. The computing system 400 includes a bus 405 or other communication component for communicating information and a processor 410 coupled to the bus 405 for processing information. The computing system 400 can also include one or more processors 410 coupled to the bus for processing information. The computing system 400 also includes main memory 415, such as a RAM or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid state device, magnetic disk or optical disk, is coupled to the bus 405 for persistently storing information and instructions. Computing device 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 400 may be coupled via the bus 405 to a display 435, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 430, such as a keyboard including alphanumeric and other keys, may be coupled to the bus 405 for communicating information and command selections to the processor 410. In another implementation, the input device 430 may be integrated with the display 435, such as in a touch screen display. The input device 430 can include a cursor control, such as a mouse, a trackball, or cursor direction keys, for communicating direction information and command selections to the processor 410 and for controlling cursor movement on the display 435.

According to various implementations, the processes or methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes or method ACTs described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an implementation of a computing system 400 has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computer server", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication (e.g., a communication network). Examples of communication networks include a local area network and a wide area network, an inter-network (e.g., the Internet), and peer-to-peer networks (e.g., ad hoc peer-to-peer networks).

The computing system such as the data processing system 114 can include clients and servers. For example, the data processing system 114 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices or servers described herein can be single modules, logic devices having one or more processing modules, one or more servers, or part of a cloud computing environment.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for overlaying calendar information in electronic messages, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:
1. A data processing system, comprising:
at least one processor; and at least one memory storing computer-executable instructions, the computer-executable instructions when executed by the at least one processor cause the data processing system to:
receive, from a client device separate from the data processing system, a request for calendar information for display in an electronic message responsive to the client device accessing the electronic message, the request (i) automatically sent by the client device to the data processing system responsive to the client device accessing the electronic message and (ii) including information about a recipient of the electronic message and an identifier indicative of calendar information of a sender of the electronic message, the identifier and the information about the recipient extracted by the client device from the electronic message;
identify, using the identifier, the calendar information of the sender of the electronic message;
identify, using the identifier and the information about the recipient of the electronic message, calendar information of the recipient of the electronic message;
retrieve, responsive to receiving the request, the calendar information of the sender of the electronic message and the calendar information of the recipient of the electronic message;
automatically generate an image depicting the calendar information of the sender of the electronic message and the calendar information of the recipient of the electronic message; and
send instructions to the client device to cause display of the image within the electronic message accessed at the client device.

2. The data processing system of claim 1, wherein the image is a second image and the identifier is an identifier of a first image depicting calendar information of the sender of the electronic message.

3. The data processing system of claim 1, wherein in identifying the calendar information of the sender of the electronic message, the computer-executable instructions when executed by the at least one processor cause the data processing system to identify at least one of:
one or more calendars of the sender of the electronic message;
a time duration; or
a plurality of designated time slots within the time duration.

4. The data processing system of claim 3, wherein the plurality of designated time slots include at least one of time slots indicating availability of the sender of the electronic message, time slots proposed by the sender of the electronic message or time slots during which the sender of the electronic message is busy.

5. The data processing system of claim 3, wherein the computer-executable instructions when executed by the at least one processor cause the data processing system to identify the calendar information of the recipient of the electronic message using one or more calendars of the recipient and the at least one of the one or more calendars of the sender of the electronic message, the time duration or the plurality of designated time slots within the time duration.

6. The data processing system of claim 3, wherein the computer-executable instructions when executed by the at least one processor cause the data processing system to:
provide a user interface to a client device of the sender of the electronic message for entering the at least one of the one or more calendars of the sender of the electronic message, the time duration or the plurality of designated time slots within the time duration; and
receive, from the client device of the sender of the electronic message, the at least one of the one or more calendars of the sender of the electronic message, the time duration or the plurality of designated time slots within the time duration.

7. The data processing system of claim 1, wherein the request further includes a flag indicating that the image is to include both the calendar information of the sender of the electronic message and the calendar information of the recipient of the electronic message.

8. The data processing system of claim 1, wherein the computer-executable instructions when executed by the at least one processor further cause the data processing system to provide an image map to the client device for display over the image at the electronic message, the image map including a plurality of map slices, each map slice of the plurality of map slices associated with a corresponding time slot of a plurality of time slots depicted by the image and including a corresponding uniform resource locator (URL) indicative of the corresponding time slot.

9. The data processing system of claim 8, wherein the computer-executable instructions when executed by the at least one processor further cause the data processing system to:
receive, from the client device, responsive to the client device selecting a time slot of the plurality of time slots, a URL of a map slice associated with the time slot selected by the client device;
determine, based on the URL, the time slot selected by the client device; and
send a response message to the client device responsive to determining the time slot selected by the client device.

10. The data processing system of claim 9, wherein the response message includes:
a response message instructing the client device to generate a calendar invite message for sending to the sender of the electronic message when the time slot selected by the client device is a time slot where both the sender and recipient of the electronic message are available, or
a response message instructing the client device to generate an error message when the time slot selected by the client device is a time slot where at least one of the sender or the recipient of the electronic message is unavailable.

11. A method, comprising:
receiving, by a data processing system from a client device, a request for calendar information for display in an electronic message responsive to the client device accessing the electronic message, the request (i) automatically sent by the client device to the data processing system responsive to the client device accessing the electronic message and (ii) including information about a recipient of the electronic message and an identifier indicative of calendar information of a sender of the electronic message, the identifier and the information about the recipient extracted by the client device from the electronic message and the data processing system different from the client device;
identifying, by the data processing system using the identifier, the calendar information of the sender of the electronic message;
identifying by the data processing system, using the identifier and the information about the recipient of the electronic message, calendar information of the recipient of the electronic message;

retrieving, by the data processing system, responsive to receiving the request, the calendar information of the sender of the electronic message and the calendar information of the recipient of the electronic message;

automatically generating, by the data processing system, an image depicting the calendar information of the sender of the electronic message and the calendar information of the recipient of the electronic message; and sending, by the data processing system, instructions to the client device to cause display of the image within the electronic message accessed by the client device.

12. The method of claim 11, wherein the image is a second image and the identifier is an identifier of a first image depicting calendar information of the sender of the electronic message.

13. The method of claim 11, wherein identifying the calendar information of the sender of the electronic message includes identifying at least one of:

one or more calendars of the sender of the electronic message;

a time duration; or a plurality of designated time slots within the time duration.

14. The method of claim 13, wherein the plurality of designated time slots include at least one of time slots indicating availability of the sender of the electronic message, time slots proposed by the sender of the electronic message or time slots during which the sender of the electronic message is busy.

15. The method of claim 13, comprising:

identifying the calendar information of the recipient of the electronic message using one or more calendars of the recipient and the at least one of the one or more calendars of the sender of the electronic message, the time duration or the plurality of designated time slots within the time duration.

16. The method of claim 13, further comprising:

providing, by the data processing system, a user interface to a client device of the sender of the electronic message for entering the at least one of the one or more calendars of the sender of the electronic message, the time duration or the plurality of designated time slots within the time duration; and receiving, by the data processing system from the client device of the sender of the electronic message, the at least one of the one or more calendars of the sender of the electronic message, the time duration or the plurality of designated time slots within the time duration.

17. The method of claim 11, wherein the request further includes a flag indicating that the image is to include both the calendar information of the sender of the electronic message and the calendar information of the recipient of the electronic message.

18. The method of claim 11, further comprising:

providing, by the data processing system, an image map to the client device for display over the image at the electronic message, the image map including a plurality of map slices, each map slice of the plurality of map slices associated with a corresponding time slot of a plurality of time slots depicted by the image and including a corresponding uniform resource locator (URL).

19. The method of claim 18, further comprising:

receiving, by the data processing system from the client device responsive to the client device selecting a time slot of the plurality of time slots, a URL of a map slice associated with the time slot selected by the client device;

determining, by the data processing system based on the URL, the time slot selected by the client device; and sending, by the data processing system, a response message to the client device responsive to the determining the time slot selected by the client device, the response message including:

a response message instructing the client device to generate a calendar invite message for sending to the sender of the electronic message when the time slot selected by the client device is a time slot where both the sender and recipient of the electronic message are available, or a response message instructing the client device to generate an error message when the time slot selected by the client device is a time slot where at least one of the sender or the recipient of the electronic message is unavailable.

20. A non-transitory computer-readable medium storing computer-executable instructions, the computer-executable instructions when executed by at least one processor cause the at least one processor to:

receive, from a client device, a request for calendar information for display in an electronic message responsive to the client device accessing the electronic message, the request (i) automatically sent by the client device to the at least one processor responsive to the client device accessing the electronic message and (ii) including information about a recipient of the electronic message and an identifier indicative of calendar information of a sender of the electronic message, the identifier and the information about the recipient extracted by the client device from the electronic message and the at least one processor separate from the client device;

identify, using the identifier, the calendar information of the sender of the electronic message;

identify, using the identifier and the information about the recipient of the electronic message, calendar information of the recipient of the electronic message;

retrieve, responsive to receiving the request, the calendar information of the sender of the electronic message and the calendar information of the recipient of the electronic message;

automatically generate an image depicting the calendar information of the sender of the electronic message and the calendar information of the recipient of the electronic message; and send instructions to the client device to cause display of the image within the electronic message accessed by the client device.

* * * * *